United States Patent [19]

Sonobe et al.

[11] Patent Number: 4,786,980
[45] Date of Patent: Nov. 22, 1988

[54] IMAGE INFORMATION RECORDING SYSTEM

[75] Inventors: Hiraku Sonobe, Yokohama; Norio Hashimoto, Tokyo, both of Japan

[73] Assignee: Canon Kabushiki Kaisha, Tokyo, Japan

[21] Appl. No.: 875,962

[22] Filed: Jun. 19, 1986

[30] Foreign Application Priority Data

Jun. 24, 1985 [JP] Japan .................. 60-137403
Jun. 24, 1985 [JP] Japan .................. 60-137404
Jun. 24, 1985 [JP] Japan .................. 60-137405

[51] Int. Cl.⁴ .......................... H04N 5/85; G11B 7/00; G11B 27/10
[52] U.S. Cl. .................................. 358/335; 358/342; 369/32
[58] Field of Search ............. 358/335, 342; 360/72.2, 360/33.1; 369/48, 49, 50, 32, 30, 124, 125, 100; 355/64, 53

[56] References Cited

U.S. PATENT DOCUMENTS

| | | | |
|---|---|---|---|
| 4,229,808 | 12/1980 | Hui | 369/48 |
| 4,283,621 | 8/1981 | Pembroke | 355/64 |
| 4,310,751 | 1/1982 | Martin et al. | 364/900 |
| 4,321,635 | 3/1982 | Tsuyuguchi | 360/72.2 |
| 4,658,299 | 4/1987 | Tanaka et al. | 358/256 |

*Primary Examiner*—Donald McElheny, Jr.
*Attorney, Agent, or Firm*—Fitzpatrick, Cella, Harper & Scinto

[57] ABSTRACT

An image information recording system reads image information out of a microfilm of which a plurality of image information items are recorded and records it onto a photodisk device. The microfilm has a Blip Mark indicative of the position of a frame. The mark is detected and index information for representing the address of image information recorded on the photodisk device is calculated. In another aspect, the recordable capacity of the photodisk device is sensed. As a result, when one unit of frames of image information is detected to be more than the photodisk device can hold, the one unit of image information is re-recorded on a second recording medium.

28 Claims, 7 Drawing Sheets

IMAGE INFORMATION RECORDING SYSTEM

FIELD OF THE INVENTION

The present invention relates to a recording system which reads image information on a first recording medium, for example, of a microfilm, and records the information on a second medium.

BACKGROUND OF THE INVENTION

Conventionally, the information in documents or the like issued in large quantities have been recorded on microfilms with high density for purposes of saving the storage space and the stored information has easily been taken out of the microfilms.

On the other hand, photodisks or photomagnetic disk devices on which information can be recorded and from which information can be reproduced have recently developed as the file means and drawn public attention. Each of photodisks or photo magnetic disks has various features such as are listed as follows:

(1) It is a disk-like recording medium (hereinafter referred to as the "disk") having a diameter of 30 centimeters and capable of accommodating 20-30 thousands of A4-sized pages of image information;

(2) It is accessible randomly during recording or reproduction and allows any desirable image information to be retrieved in one second out of 20-30 thousands of pages of information recorded on the disk;

(3) A photodisk device is one which allows unnecessary information to be erased therefrom and which allows information to be recorded again thereof; and (4) It records image information thereon in the form of an electric signal, so that the information and can be transmitted. At present, they begin to be used as file means and are substituting for microfilms. When a photodisk device is used as the file device, an electric reader which electrically reads the image information filed so far in a microfilm is needed in order to record and accommodate the information in the microfilm into the photodisk.

When the image information read by the reader is recorded on the disk, management information for the image information (hereinafter referred as to the "index informatio") must be recorded together with the image information in order to facilitate retreival of the image information at a time of reproduction; i.e. the index information that the Nth frame information in the film is recorded at an address J of the photodisk. There is, however, neither frame numerical information of N frame in a microfilm, nor is index information added to the image information input to the photodisk device, of course, which makes the retrieval difficult.

Many of various microfilms each including various information such as patent publications take the form of a file of pages. If the operator prepares and register index information for each page, the problem will arise that recording will require too much time and that the index information recording area will be enlarged.

When information of file units, each including a plurality of pages, is recorded onto a photodisk, the storage capacity of the photodisk can run low during recording. At this time, if the next image begins to be recorded on the next disk (on the recording area of the opposite disk surface), exchange or turning over of the disk will be needed when the file information is copied or indicated in files due to retrieval and so on, which will urge the operator to wait for some time and to perform some excess acts.

SUMMARY OF THE INVENTION

It is an object of the present invention to provide an image information recording system which is free from the above drawbacks.

It is another object of the present invention to improve an image information recording system.

It is still another object of the present invention to provide an image information recording system which can easily prepare index information used when the image information is recorded from a first recording medium onto a second recording medium.

It is a further object of the present invention to provide an image information recording system which when the image information on a first recording medium is recorded on a second recording medium, can reduce an amount of index information on the second recording medium.

It is a still further object of the present invention to provide an image information recording system which after the image information on a first recording medium is recorded on a second recording medium, can smoothly retrieve image information on the second recording medium without interruption of the image information retrieval.

It is another object of the present invention to provide an image information recording system which after the image information on a first recording medium is recorded on a second recording medium, can easily retrieve image information on the second recording medium.

Other objects of the present invention will be apparent from the description of the embodiments thereof on the basis of the accompanying drawings, and the attached claims.

DETAILED DESCRIPTION OF THE PREFERRED EMBODIMENTS

The embodiments of the present invention will be described in more detail with respect to the accompanied drawings.

Figure 1:
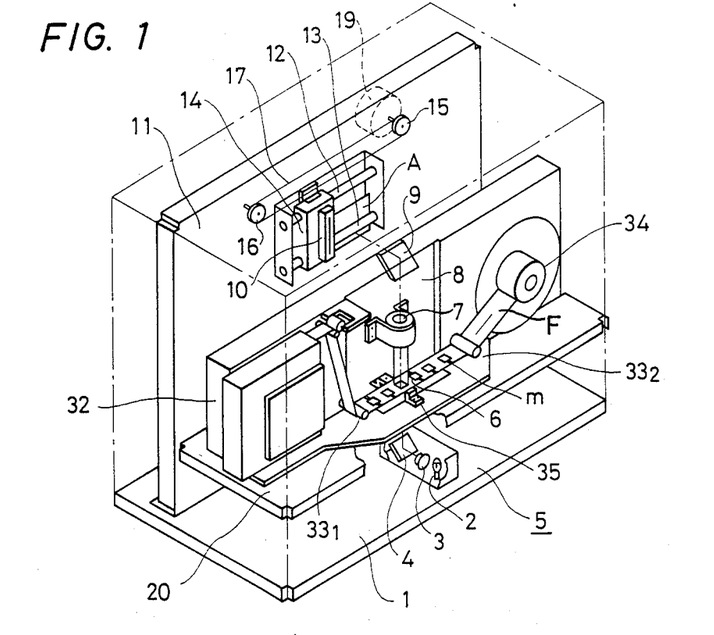
FIG. 1 is a perspective view showing the structure of a microfilm reader.

FIG. 1 shows the structure of a microfilm reader to which the present invention is applied.

A microfilm carrier means is fixed to an intermediate plate 20 parallel to the bottom plate 1 of the reader body to which is in turn fixed a lighting unit 5 consisting of a halogen lamp 2, a lens 3, and a mirror 4. The luminous flux from the lighting unit 5 irradiates a stage 6, where a retrieved frame image in a microfilm stops, through a window in the intermediate plate 20. The illuminous flux is focused on the center of an enlarging lens 7 to correct uneven light quantity distribution and improve the lighting efficiency. One illumined frame image area of the microfilm is imaged on a plane A in FIG. 1 via a mirror 9 by the enlargening lens 7 fixed to a side plate 8 of retrieval means. A one-dimensional 5,000-bit photoelectric conversion means 10, for example, made of CCDs, is supported over the imaged plane A slidably along guide shafts 12, 13 fixed to an inner side plate 11 such that the conversion means 10 can scan the focused plane A. A one-dimensional CCD carriage 14 is connected to a wire 17 running around a drive motor pulley 15 and a fixed pulley 16 disposed on the inner plate 11 and is reciprocated for scanning purposes by rotation of a drive motor 19 which drives the drive motor pulley 15. A film feed cartridge 32 is removably mounted in the reader and accomodates a microfilm F in the form of a roll, the microfilm including a multiplicity of image frames and marks. Reference numerals $33_1$, $33_2$ identify film guide rollers; and reference numerals 34 and 35 identify a film take-up reel and a mark detector, respectively. A motor which drives the take-up reel 34 and a mechanism which removes the film F out of the cartridge 32 are provided, although both are not shown.

The image information read by the CCDs 10 out of the microfilm F by a scan as mentioned above is recorded on a photodisk device to be described below.

Figure 2:
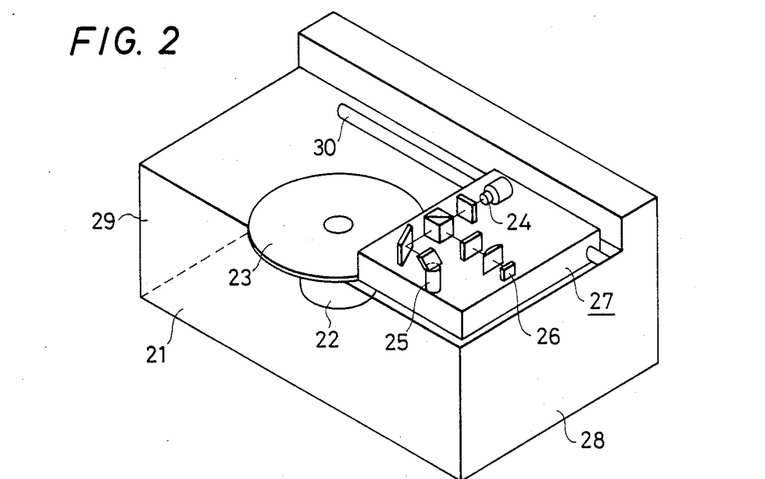
FIG. 2 shows the structure of a photodisk device.

FIG. 2 shows one example of the photodisk device.

Fixed to the bottom plate 21 of the disk device body is a spindle motor 22 having a turntable with which is engaged a disk 23 carrying a medium of TeOx or the like. An optical head 27 having a well-known photodisk recording and reproducing optical system including a semiconductor laser 24, a focusing lens 25 and a sensor 26. The head 27 is supported on a guide 30 fixed to side plates 28, 29 of the device body such that it can scan the disk 23 radially.

The image information read by the image reader is input to the disk device which modulates the laser 24 according to that image information or the image information compressed by a data compression circuit, not shown. The modulated laser beam is focused by the focusing lens 25 as a spot of about 1 micrometer onto the rotating disk 23. The resulting heat energy causes the phase transition of TeOx on the surface of the disk 23 to form a bit which differs in reflectance from its ambience and thus to record information sequentially along the circumference of the disk.

The recording head 27 scans the disk radially along the guide 30 and the image information is recorded spirally with time.

The image information read sequentially by the microfilm image reader according to the above sequence is recorded on the disk 23.

Assume that the film F removed from the cartridge 32 by a film removing mechanism, not shown, is now being wound by the take-up reel 34 via the guide rollers $33_1$, $33_2$.

The film F contains a multiplicity of image information frames and marks m, so-called Blip Marks, one recorded for each frame.

Each mark m differs in density from its ambience. When that portion of the film F where the mark is recorded passes through between the lamp 2 and the mark detector 35, the light incident on the mark detector 35 is interrupted by the mark m and hence a mark detecting signal is output by the detector 35. This mark detecting signal is counted by a control circuit of the microfilm reader which is the present embodiment.

Figure 3:
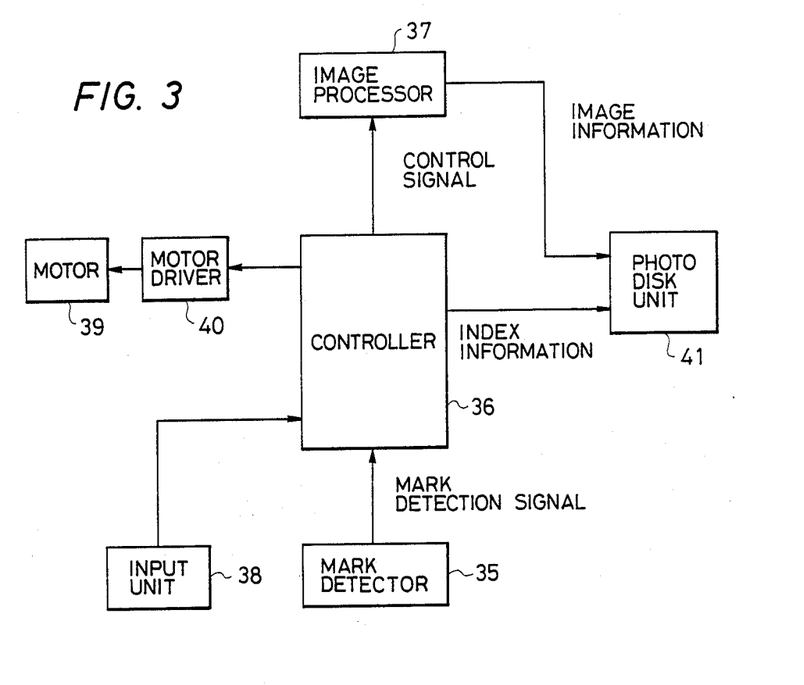
FIG. 3 is a block diagram showing the structure of the whole system.

FIG. 3 is a simple block diagram of the whole system.

A controller 36 is composed of a CPU and so on; an image processor 37 converts the film frame information read by the CCDs 10 to a digital signal, puts this signal in binary form, etc., and outputs it. A frame mark detector 35 outputs a frame mark signal to the controller 36. An input device 38 inputs the number of a film frame, the retrieval of which is desired. Reference numerals 39, 40 and 41 identify a film carrier motor, a motor driver for the motor 39 and an information recording and reproducing device (hereinafter referred to as a photodisk device) using a photodisk memory, etc., respectively.

Assume that all the frame information recorded in the cartridge 32 will now be transferred to the photodisk 41.

The film F is loaded from the cartridge 32, as mentioned above, and a mark detection signal due to a first-frame mark is output to the controller 36 which then stops the motor 39, thereby setting a first frame on the stage 6.

The operator then inputs index information corresponding to the first frame using the input device 38. For example, one frame corresponds to each address. Thus inputting any particular index information involves designation of an address N. This index information is input to the controller 36, stored in a memory therein and simultaneously transferred to the photodisk device 41.

Figure 4:
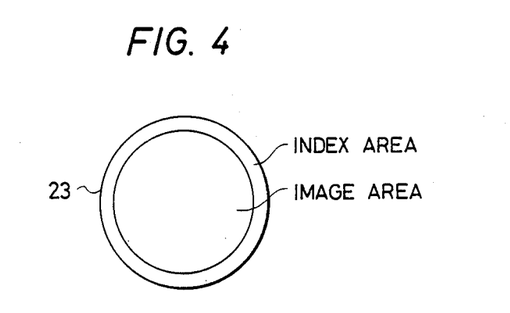
FIG. 4 shows the optical disk device schematically.

The disk device 41 records, as an index, index information and the address of a location where image information is stored, for example, in an index location of the disk of FIG. 4.

When the index for image information has been entered on the disk device 41, as mentioned above, the CCDs 10 reads frame information out of the microfilm and the image processor 37 transfers the image information to the disk device 41.

The disk device 41 sequentially records the transferred image information at an address N entered as index information.

When the transfer of image information ends, the controller 36 drives the motor 39 to feed the film F. When the mark of the next frame is detected by the mark detector 35 which then outputs a mark detection signal to the controller 36, the controller 36 stops the motor 39 to set a second frame of the film on the stage 6.

The controller 36 performs an arithmetic operation on the index information N stored in the memory (herein, the arithmetic operation involves addition) to output and transfer N+1 to the disk device 41. The disk device 41 enters the index for the second frame in the index area, as mentioned above, and record the image information transferred by the image processor 37.

Figure 5:
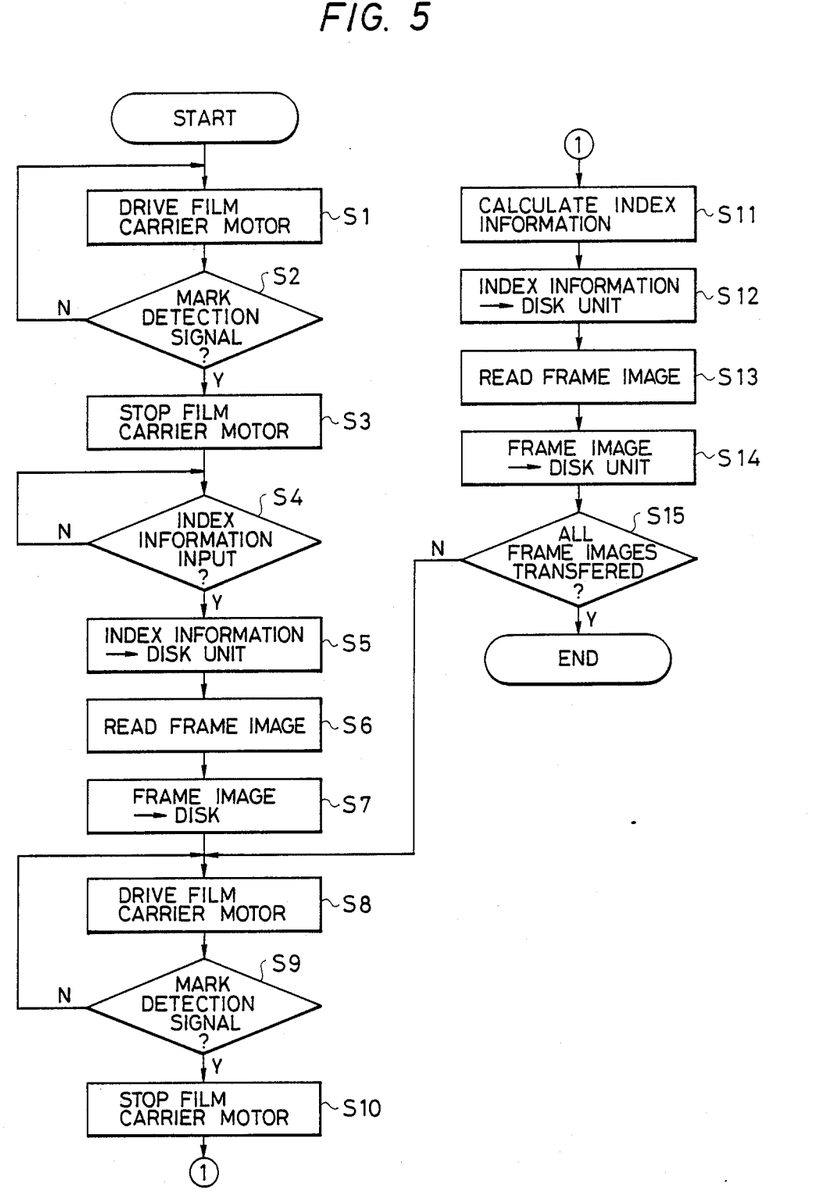
FIG. 5 is a flowchart showing the control operation effected when a microfilm image is recorded on a photodisk.

Repetition of the above operation leads to automatic transfer and entry of all the frame information accommodated in the cartridge 32 into the disk device 41. The operation of the controller is illustrated in FIG. 5.

While, in the above embodiment, the input index information N as it stands is shown a being transferred to the disk device 41, transfer of the index information is not limited to this. For example, proper arithmetic operation may be performed on the value of the input information N to derive L which is then transferred as index information.

While, in the above embodiment, all the film frames are shown as being transferred to the disk device, starting with the first film frame, of course, it is possible, for example, to designate any desired area ranging rrom any particular frame to another. Entry may be performed starting with the last frame after the film has been wound completely.

While the index area of the disk device 41 has been illustrated as using the structure shown in FIG. 4, the structure of the index area is not limited to it. For example, floppy disks or the like may be used as the index area in addition to the photodisk device.

While the above embodiment has been described as using a photodisk, the present may use other mediums such as photomagnetic-disks or optical cards.

As mentioned above, index information can be prepared for transfer of image information to the photodisk device using a detection signal indicative of detection of a Blip Mark which is used as retrieval means for a microfilm. Thus a one-to-one correspondence is realized between a microfilm frame and photodisk information.

The operator can transfer by a single operation to the photodisk all the frame information in a microfilm cartridge together with their indexes to the photodisk, which leads to energy reservation.

An embodiment in which frame images are recorded from a microfilm, which includes a plurality of file units, each including frame images, to a photodisk device will next be described.

Figure 6:
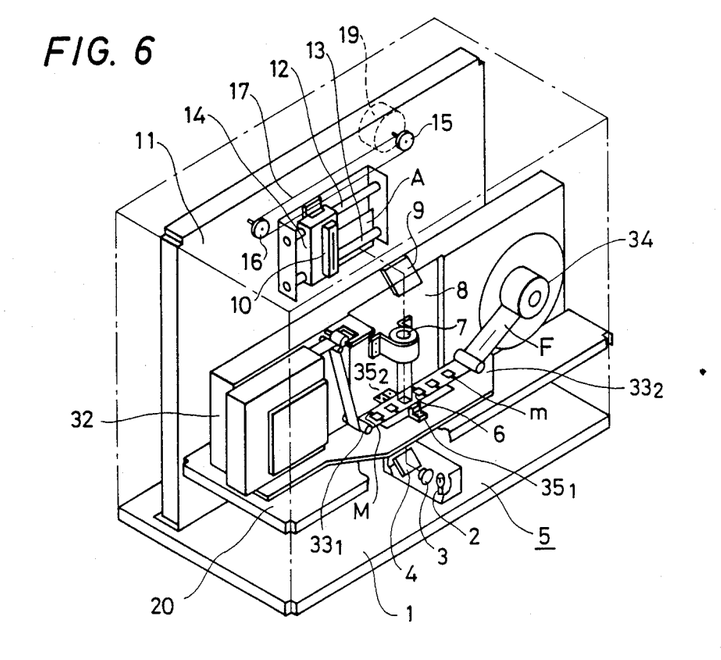
FIG. 6 illustrates another embodiment of the structure of the microfilm reader.

FIG. 6 shows the structure of the reader device of the present embodiment. Reference numerals $35_1$ and $35_2$ identify a frame mark detector and a file mark detector, respectively. Other components are the same as those in FIG. 1 and a further detailed description thereof will be omitted. The film F contains in a single file a multiplicity of image information frames, frame marks m, one recorded in each frame, and a film mark M recorded in the head frame.

The marks m and M, so-called Blip Marks, differ in density from their ambiences. Thus when those portions of the film where the marks are recorded pass through between the lamp 2 and the corresponding ones of the mark detectors $35_1$ and $35_2$, the marks m and M interupt the incident light on the mark detectors $35_1$ and $35_2$ which each then output a mark detection signal.

Those mark detection signals each are counted by the controller of the microfilm reader which is the present embodiment.

Figure 7:
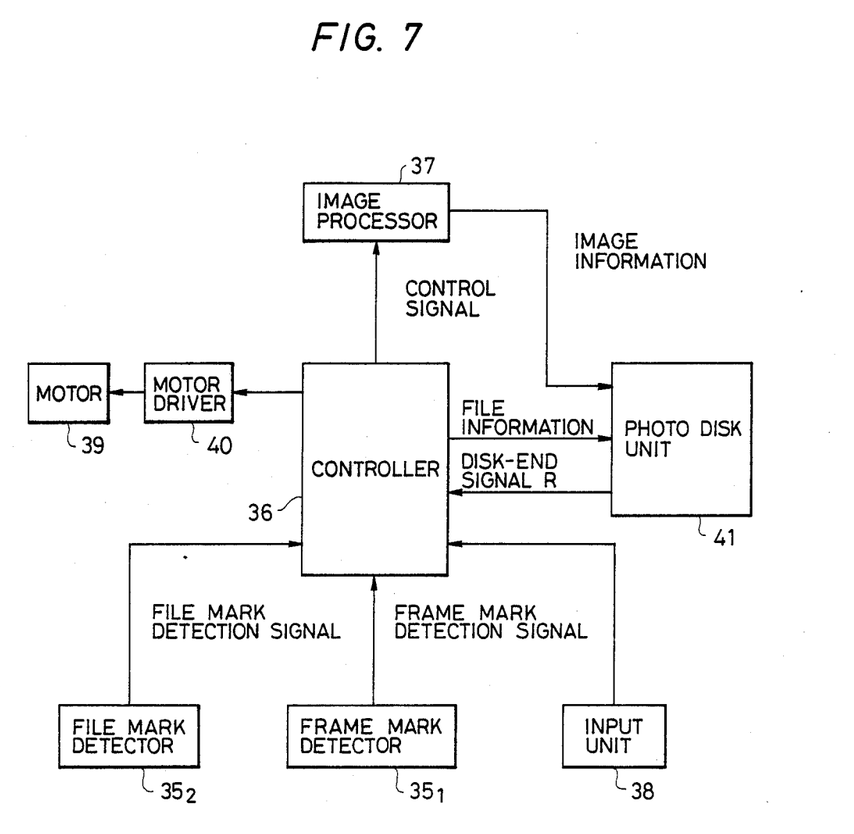
FIG. 7 shows another embodiment of the structure of the whole system.

FIG. 7 is a simplified block diagram of the entire system. This includes a combination of the block diagram of FIG. 3 and file mark detector $35_2$ and a further detailed description thereof will be omitted.

Assume that all the frame information recorded in the cartridge 32 is transferred to the photodisk device.

As described above, a film F is loaded from the cartridge 32. A frame mark detection signal due to a first frame mark is output to the controller 36 which then stops the motor 39 and sets the first frame on the stage 6.

First, the file mark in the head frame of a first file is detected by the mark detector $35_1$ which then outputs a file mark detection signal to the controller 36. Thus the count "0" is set in a file mark counter of the controller 36. At the same time, a frame mark is detected by the frame mark detector $35_1$ which then outputs a frame mark detection signal to the controller 36. Thus, the count "0" is set in a frame mark counter of the controller 36.

The CCDs 10 read the frame information in the microfilm and the image information is transferred from the image processor 37 to the photodisk device 41 which records the image information thereon.

After transfer of the image information has ended, the controller 36 drives the motor 39 to feed the film F. When the mark of the next frame is detected by the mark detector $35_1$ which then outputs a mark detection signal to the controller 36, the controller stops the motor 39 to set the second frame of the film on the stage 6.

Figure 8:
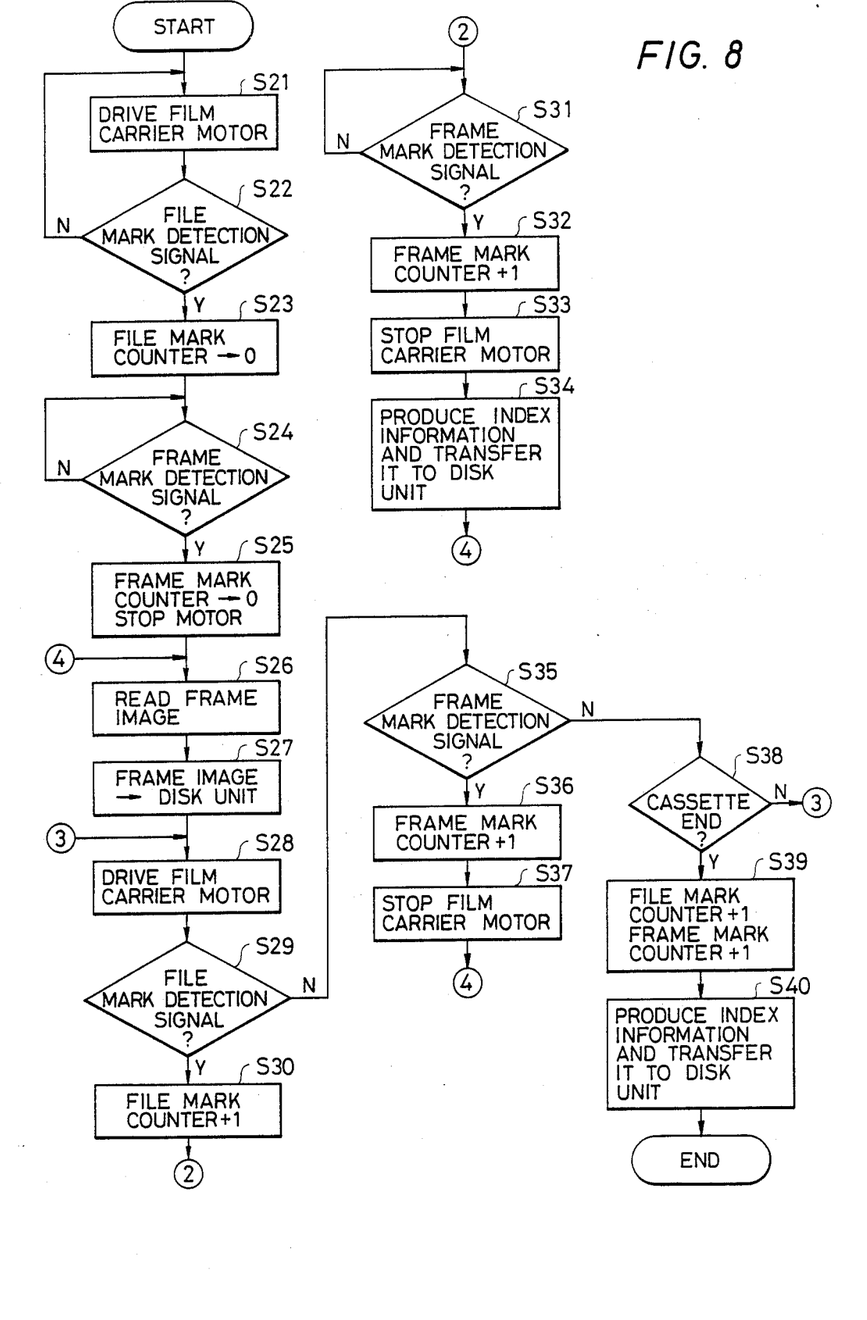
FIGS. 8 and 9 show another embodiment of the control operation effected when the image information on a microfilm is recorded onto a photodisk.

In the same way, frame images are sequentially recorded on the photodisk device. When the frame mark detector $35_1$ detects a frame mark, it outputs a frame mark detection signal to the controller 36 to increment the frame mark counter by one. Next, when the file mark detector $35_2$ detects a file mark in the head of a second file, it outputs file mark detection signal to the controller 36 to cause the frame mark counter to cout one. At the same time, the frame mark detections signal due to the frame mark is input to the controller 36 to cause the frame mark counter to count "20", for example. At this time, code information that one file includes 20 frames is formed and, for example, the information "1-20" and the head information address in that file are entered as index information. The location where this index information is entered may be in the index area of the photodisk, as shown in FIG. 4, a floppy disk for management of index information, or the like. After entry of index information, the frame mark counter is again set to "0" and recording of image information in a similar manner to the above is performed until the file mark of a third file is detected. Subsequently, index information is entered for each file and image information and index information are continued to be recorded and entered until the final frame. Finally, when the fact that there is no more remaining image information is detected using the well-known cassette end detection method, the file mark counter and the frame mark counter count up from P and Q to P+1 and Q+1, respectively, and the code information "(P+1)−(Q+1)" is formed and recorded as index information. Thus the transfer operation ends. The operation of the controller 36 just mentioned above is illustrated in FIG. 8.

While, in the just mentioned embodiment, the film code for the first file is selected to be "1", it is not limited to this. The value of the file code may be set to any desired one by the operator using the input device 38 (for example, see published Japanese patent application No. 000001/1983). In a single disk, the file codes may be serial numbers. Alternatively, a cassette number may be added as code information before the file code.

As described above, the present invention calculates and forms file code information using a file mark detection signal indicative of a Blip Mark used as the microfilm retrieving means, and forms index information from the code information and the number of frames in the file counted in response to the frame mark detection signal. The index information is easy to retrieve.

That is, when the image information of the microfilm is transferred to the disk, index information is automatically formed in units of a file and recorded, and image information can easily be retrieved in units of a file. It is unnecessary for the operator to enter index information for each frame and the entry time is shortened. Furthermore, the entry area is reduced.

If a large area is available for the index information recording area, index information may be automatically entered frame by frame. Namely, the index information for a first frame of a first file is "1-1", the index information for a second frame is "1-2", and so on. That is, each time a frame mark is detected, it is only required that the index information "P - Q" is formed and entered. In the above embodiment, when the first file or frame mark is detected, the setting P=0 and Q=0 is performed. Thus it is required that the index information is set to P=1 and Q=1 and that when the next file mark is detected, the setting Q=1 is performed in the frame mark counter.

After entry of index information, if a keyword corresponding to the index information is added, retrieval will become more easily.

Assume that the recording area of the disk has run low when the file mark counter and the frame mark counter are in counts P and Q, respectively. The operation of the controller performed at this time will be illustrated in the flowchart of FIG. 9. That is, the disk device performs a well-known recording sequence (step 51) and compares a signal X indicative of the latest recorded address on the disk recognized by the photodisk and a signal Y indicative of the final address of the disk (step 52). When the difference becomes less than one image information item Z, the disk device outputs a recording area end signal R (hereinafter referred to as the "disk end signal") (step 53).

Figure 9:
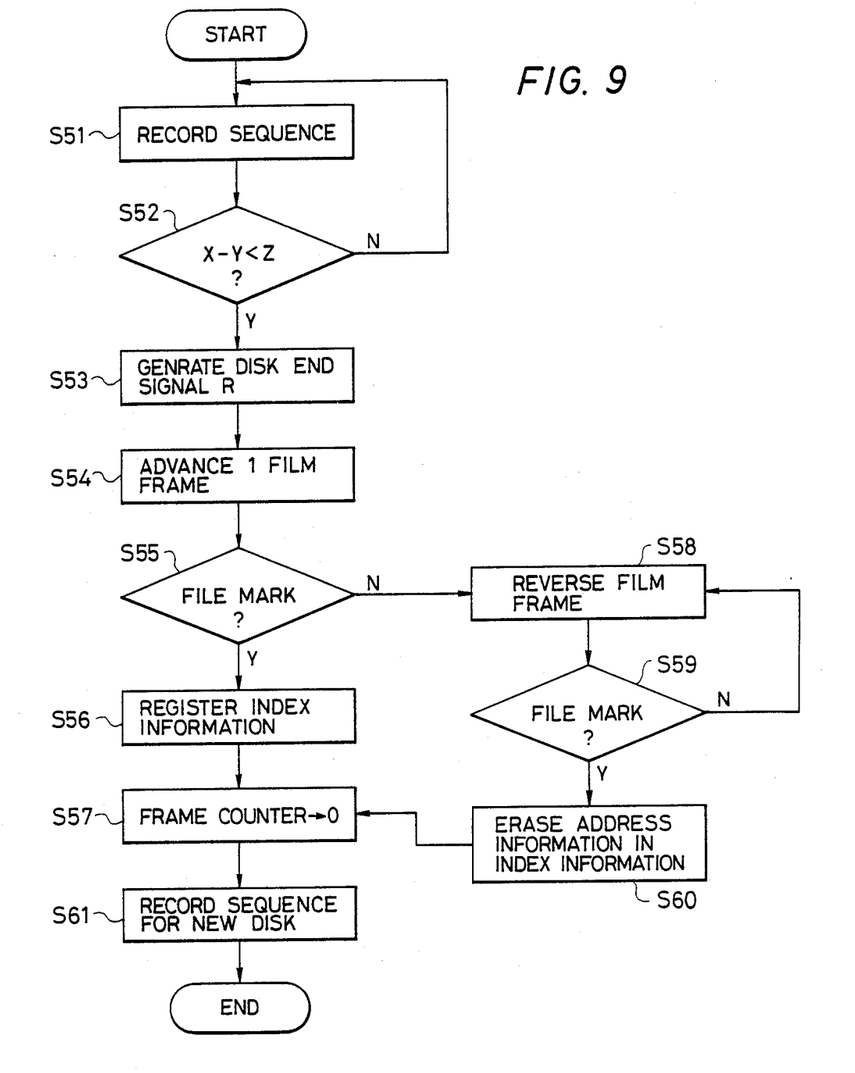

At this time, the controller 36 of the reader delivers a signal to the motor driver 40 of the film carrier means on the basis of the disk end signal R to advance the film by one frame (step 54). The mark detector 35 is used to ascertain the presence of a file mark (step 55). When the presence of a file mark is ascertained, the file counter and the frame mark counter each are incremented by one, and the index information is formed and entered (step 56). If no file mark is detected, the last image information recorded on the disk will be one obtained in the course of sequentially transferring and recording all the image information from the file. Thus the controller 36 applies to the motor driver 40 a signal to reverse film frames thereby to reverse the carrier means to stop same at an image having the first file mark which will appear during reversing operation (step 58). This image is at the head of the interrupted file. Then the address information of the head image in the file is erased in the memory (step 60). Then, the value P of the file counter is held unchanged and the frame mark counter is set to 0 (step 57).

Recording is now performed on a new disk, starting with the head of the interrupted film (step 61).

It is noted that the address information becomes the recording start address of the new disk.

As described above, when the disk is filled up to its recording capacity in the course of transferring image information from a file, a sequence may be employed in which reentry is performed onto the next disk, starting with the head of the interrupted file. In this case, it is unnecessary to exchange or reverse the disk, or to force the operator to wait for some time or to perform a troublesome act.

In the above embodiment, a disk end signal R may be produced when the recorded address of the disk becomes the final address (i.e. Z=1). When information is compressed for recording, the value of Z may be one corresponding to the average length of the image information input so far. The timing of advancing the counter, and the timing of recording and erasing the index information, disclosed herein, do not restrict the present invention.

The present invention is not limited to the above embodiments and can be modified to various forms without the scope of the attached claims.

What we claimed is:

1. An image storing system comprising:
   first memory means in which is stored a plurality of images and first retrieving information for use in retrieving the stored images;
   second memory means capable of storing a plurality of images;
   control means for controlling said first and second memory means to read out the images stored in said first memory means and store them in said second memory means; and
   converting means for automatically converting the first retrieving information into second retrieving information for use in retrieving the images read from said first memory means and stored in said second memory means.

2. A system according to claim 1, wherein the first retrieving information includes marks indicative of the position of associated images stored in said first memory means.

3. A system according to claim 1, wherein said first memory means includes microfilm and the first retrieving information includes marks indicative of associated frames of said microfilm.

4. A system according to claim 1, wherein said second memory means includes an optical recording member.

5. A system according to claim 1, wherein said first memory means includes detecting means for detecting the first retrieving information and said converting means includes count means for counting the detected first retrieving information and is capable of converting the first retrieving information into the second retrieving information in response to the output of said count means.

6. A system according to claim 1, wherein said converting means is capable of converting the first retrieving information into the second retrieving information in accordance with the position of an associated image stored in said first memory means.

7. A system according to claim 1, wherein the first retrieving information includes file retrieving information for use in retrieving a file image consisting of a plurality of images and page retrieving information for use in retrieving each image in a file image.

8. A system according to claim 7, wherein said first memory means includes first and second detecting means for detecting the file retrieving information and the page retrieving information, respectively, and said converting means includes first and second count means for counting the detected file retrieving information and the page retrieving information, respectively, and is capable of converting the first retrieving information into the second retrieving information in response to the outputs of said first and second count means.

9. A system according to claim 1, wherein said second memory means is capable of storing the second retrieving information and the images in the same memory medium.

10. A system according to claim 1, wherein said converting means is capable of converting the first retrieving information into the second retrieving information in synchronization with the read-out of images from said first memory means and storage thereof in said second memory means.

11. An image storing system comprising:
first memory means in which is stored a plurality of single unit file images, each consisting of a plurality of stored images, wherein said first memory means includes retrieving means for retrieving the stored images;
second memory means capable of storing a plurality of unit file images; and
control means for controlling said first and second memory means to read out the unit file images stored in said first memory means and store them in said second memory means;
wherein if said second memory means cannot accept an entire unit file image, said retrieving means is capable of retrieving a particular image of the unit file image for use as the first image provided in a subsequent read-out from said first memory means.

12. A system according to claim 11, further comprising generating means for generating retrieving information for use in retrieving the unit file images read out from said first memory means and stored in said second memory means, wherein if said second memory means cannot accept an entire unit file image, said control means invalidates the retrieving information generated by said generating means.

13. A system according to claim 11, wherein the particular image is retrieved when the remaining capacity of said second memory means is insufficient for the amount of remaining images in theunit file image to be stored therein.

14. A system according to claim 11, wherein the particular image is the first image in the unit file image to be stored therein.

15. A system according to claim 11, wherein said first memory means includes microfilm.

16. A system according to claim 11, wherein said second memory means includes an optical recording medium.

17. A system according to claim 11, wherein said second memory means includes an exchangeable memory medium and after said retrieving means retrieves the particular image, said control means is capable of causing the entire unit file image to be stored in an exchanged memory medium of said second memory means.

18. An image storing apparatus comprising:
input means for inputting an image provided from external memory;
memory means for storing a plurality of images input by said input means; and
converting means for automatically converting first retrieving information usable by and output from said external memory means into second retrieving information for use in retrieving the images stored in said memory means.

19. An apparatus according to claim 18, wherein said memory means is capable of storing the second retrieving information and associated images input by said input means in the same memory medium.

20. An apparatus according to claim 18, wherein said converting means is capable of converting the first retrieving information into the second retrieving information by counting a number associated with the first retrieving information.

21. An apparatus according to claim 18, wherein said second memory means includes an optical recording medium.

22. An apparatus according to claim 18, wherein said converting means is capable of converting the first retrieving information into the second retrieving information in synchronization with the input of images from said input means.

23. An image storing apparatus comprising:
memory means in which is stored a plurality of single unit file images, each consisting of a plurality of stored images;
retrieving means for retrieving images stored in said memory means; and
output means for outputting images retrieved from said memory means;
wherein if said output means cannot output an entire unit file image, said retrieving means is capable of retrieving a particular image of the unit file image for use as the first image provided in a subsequent output from said output means.

24. An apparatus according to claim 23, wherein the particular image is retrieved when the remaining capacity of a memory for receiving the images output from said output means is insufficient for the amount of remaining images in the unit file image being output.

25. An apparatus according to claim 24, wherein said output means is capable of outputting the images to another memory.

26. An apparatus according to claim 23, wherein the particular image is the first image in the unit file image being output.

27. An apparatus according to claim 23, wherein after the particular image is retrieved, said control means outputs the entire unit file image including the particular image.

28. An apparatus according to claim 23, wherein said memory means includes microfilm.

* * * * *